United States Patent
Deshmukh et al.

(10) Patent No.: US 10,394,964 B2
(45) Date of Patent: Aug. 27, 2019

(54) GESTURE BASED SYSTEM FOR TRANSLATION AND TRANSLITERATION OF INPUT TEXT AND A METHOD THEREOF

(71) Applicant: OSLABS PTE. LTD., Singapore (SG)

(72) Inventors: Rakesh Deshmukh, Mumbai (IN);
Sudhir Bangarambandi, Mumbai (IN);
Akash Dongre, Mumbai (IN);
Hariharan Padmanabhan, Mumbai (IN)

(73) Assignee: OSLABS PTE. LTD., Singapore (SG)

( * ) Notice: Subject to any disclaimer, the term of this patent is extended or adjusted under 35 U.S.C. 154(b) by 116 days.

(21) Appl. No.: 15/090,117

(22) Filed: Apr. 4, 2016

(65) Prior Publication Data

US 2017/0286405 A1    Oct. 5, 2017

(51) Int. Cl.
*G06F 3/0488* (2013.01)
*G06F 17/28* (2006.01)
*G06F 17/22* (2006.01)
*G06F 3/01* (2006.01)
*G06F 3/023* (2006.01)
*G06F 3/0484* (2013.01)

(52) U.S. Cl.
CPC ............ *G06F 17/289* (2013.01); *G06F 3/018* (2013.01); *G06F 3/0233* (2013.01); *G06F 3/0484* (2013.01); *G06F 3/0488* (2013.01); *G06F 3/04883* (2013.01); *G06F 17/2223* (2013.01)

(58) Field of Classification Search
CPC .............................. G06F 17/289; G06F 3/0488
USPC ........................................................ 715/853
See application file for complete search history.

(56) References Cited

U.S. PATENT DOCUMENTS

| | | | | |
|---|---|---|---|---|
| 9,984,059 B2* | 5/2018 | Studer | .................... | G06F 3/0482 |
| 2009/0271178 A1* | 10/2009 | Bodin | .................... | G06F 17/289 |
| | | | | 704/8 |
| 2010/0017872 A1* | 1/2010 | Goertz | .................. | G06F 3/0481 |
| | | | | 726/16 |
| 2013/0198609 A1* | 8/2013 | Mokhtarzada | .......... | G06F 3/048 |
| | | | | 715/234 |
| 2014/0303960 A1* | 10/2014 | Orsini | ................. | G06F 17/2854 |
| | | | | 704/2 |
| 2015/0106702 A1* | 4/2015 | Scott | ....................... | G06F 17/24 |
| | | | | 715/265 |

(Continued)

OTHER PUBLICATIONS

Designing Gestural Interfaces: Touchscreens and Interactive Devices, by Saffer, Dan, O'Reilly Media 2008, and p. 28 for a general discussion about a swipe gesture.*

*Primary Examiner* — William D Titcomb
(74) *Attorney, Agent, or Firm* — Barry Choobin; Patent 360 LLC

(57) ABSTRACT

A gesture based system for translation and transliteration of input text, and a corresponding method have been disclosed. The system and method provide for selective translation and transliteration of the input text, based on the gestures performed by a user. When the user performs a left swipe gesture, input text which is in a first language is translated into a language prescribed by the user. In the event that the user performs a right-swipe, the input text is transliterated from a first language, into a language prescribed by the user. The user is also enabled to switch back to the original language of the input text, that is, the first language, by performing predetermined gestures.

6 Claims, 3 Drawing Sheets

(56) References Cited

U.S. PATENT DOCUMENTS

2016/0179790 A1* 6/2016 Watanabe ........... G06F 17/2818
 704/7
2016/0253434 A1* 9/2016 Yu ...................... G06F 17/2785
 707/760
2016/0267200 A1* 9/2016 Guo ................. G06F 17/30973

* cited by examiner

GESTURE BASED SYSTEM FOR TRANSLATION AND TRANSLITERATION OF INPUT TEXT AND A METHOD THEREOF

CROSS REFERENCE TO RELATED APPLICATIONS

Benefit is claimed under 35 U.S.C. 119(a)-(d) to Foreign application Serial No. 3161/MUM/2013 filed in India entitled "METHOD AND SYSTEM FOR REAL TIME LANGUAGE TRANSLATION AND TRANSLITERATION", on Oct. 4, 2013, which is herein incorporated in its entirety by reference for all purposes.

BACKGROUND

Technical Field

The present disclosure relates to the field of user interfaces. Particularly, the present disclosure relates to Indian language interfaces. More particularly, the present disclosure relates to user interfaces with translation and transliteration capabilities.

Description of the Related Art

In view of the recent technological advancements in the domain of communication, there has been a substantial increase in the number of people using mobile phones for the purpose of communicating with one other. Mobile phones available in the market today enable users to verbally communicate with one another, and also enable users to exchange text messages.

Further, some of the mobile phones also provide users with machine translation facilities. Typically, machine translation facilities are provided on mobile phones as separate, installable software applications. Further, a user also has the option of accessing, the World Wide Web on his mobile phone to avail the machine translation facilities provided on the Internet.

However, one of the drawbacks associated with prior-art machine translation facilities and applications thereof is that these applications are not integrated with the operating system of the mobile phone and in order to make use of these facilities to get the input text translated, the user will have to manually copy the input text and feed the same to the translation application. The aforementioned process of availing machine translation on prior art translation facilities (applications) not only makes the translation process cumbersome and difficult to implement.

To alleviate the aforementioned problems and to simplify the entire process of translation/transliteration of input text, US Patent Application Publication US2007/0255554 proposed 'a system and method for providing automatic language translation m a telecommunications network'. However, the system envisaged by US2007/0255554 involved routing a communication call via a service center for automatic translation. The use of a third part service center for automatic translation, means that firstly, the secrecy confidentiality of the input text is compromised as it is being re-routed to a third-party service center, and secondly the user would not be able to compare the original text and the translated text since the actual translation takes place while the message is in transit. Further, the prior art systems do not provide the facility of transliterating from an Indic language to English language.

OBJECTS

An object of the present disclosure is to provide a system that enables efficient and effective translation of input text.

Yet another object of the present disclosure is to provide a system that enables effective and efficient transliteration of the input text.

Still a further object of the present disclosure is to provide a system that enables translation and transliteration of the input text based on predetermined gestures performed by the user.

One more objective of the present disclosure is to provide a system that is user friendly and easy to use.

Yet another object of the present disclosure is to make available a system that provides for translation and transliteration of input text from a plurality of Indic languages to English and vice-versa.

Still a further object of the present disclosure is to provide a system that enables a user to provide the input text in a native (Indic) language, and subsequently covert the input text into English before transmission of the input text as SMS/E-mail.

Yet another objective of the present disclosure is to provide a system that enables a user to receive a text string in English, and subsequently covert the received text string into any of the predetermined Indic languages.

SUMMARY

The present disclosure envisages a computer implemented system for selectively expressing an input text in a language other than the input language. The system envisaged by the present disclosure translates/transliterates the input text based on the gestures performed by a user. The system comprises a user interface configured to receive the text, as input from the user.

The system further includes a recognition module cooperating with the user interface. The recognition module is configured to recognize the gestures performed by the user on the user interface, and convert predetermined gestures of the user into corresponding electrical signals. The electrical signals include instructions for expressing the input text in a language other than the input language.

The system further includes a translation module cooperating with the recognition module to selectively receive the electrical signals, the translation module further configured to translate the input text subsequent to receiving the electrical signals from the recognition module.

The system further includes a transliteration module cooperating with the recognition module to selectively receive the electrical signals, the transliteration module further configured to transliterate the input text subsequent to receiving the electrical signals from the recognition module.

In accordance with the present disclosure, the user interface further cooperates with the translation module and transliteration module to receive translated text and transliterated text, the user interface still further configured to selectively display at least the input text, the translated text and the transliterated text, based on the predetermined gestures performed by the user.

In accordance with the present disclosure, the recognition module is further configured to recognize at least a swipe left gesture and a swipe right gesture performed by the user, on the user interface.

In accordance with the present disclosure, the recognition module is further configured to covert the swipe left gesture into electric signals for transliterating the input text provided by the user, the recognition module further configured to convert the swipe right gesture into electric signals for translating the input text provided by the user.

The present disclosure further envisages a computer implemented method for selectively expressing an input text in a language other than the input language, based on the gestures performed by a user. In accordance with the present disclosure, the computer implemented method comprises the following steps: receiving input text from the user, via a user interface; recognizing, using a recognition module, predetermined gestures performed by the user on the user interface; converting the predetermined gestures from the user into corresponding electrical signals, wherein the electrical signals comprise instructions for expressing the input text in a language other than the input language; selectively transmitting the electrical signals to a translation module and a transliteration module; translating the input text, subsequent to receiving the electrical signals from the recognition module; transliterating the input text, subsequent to receiving the electrical signals from the recognition module; and receiving translated text and transliterated text using the user interface; and selectively displaying the input text, the translated text and the transliterated text, the user interface, based on the predetermined gestures performed by the user.

In accordance with the present disclosure, the step of recognizing predetermined gestures performed by the user on the user interface, further includes the step of recognizing at least a swipe left gesture and a swipe right gesture performed by the user, on the user interface.

In accordance with the present disclosure, the step of recognizing at least a swipe left gesture and a swipe right gesture, further includes the step of converting the swipe left gesture into electric signals for transliterating the input text provided by the user, and converting the swipe right gesture into electric signals for translating the input text provided by the user.

A non transitory computer readable medium having computer readable instructions stored thereupon, the computer readable instructions when executed by a processor, cause a computer enabled device to: receive input text from the user, via a user interface; recognize, using a recognition module, predetermined gestures performed by the user on the user interface; convert the predetermined gestures from the user into corresponding electrical signals, wherein the electrical signals comprise instructions for expressing the input text in a language other than the input language; selectively transmit the electrical signals to a translation module and a transliteration module; translate the input text, subsequent to receiving the electrical signals from the recognition module; transliterate the input text, subsequent to receiving the electrical signals from the recognition module; and receive translated text and transliterated text using the user interface; and selectively display the input text, the translated text and the transliterated text, on the user interface, based on the predetermined gestures performed by the user.

In accordance with the present disclosure, the computer readable instructions are further configured to enable the computer enabled device to recognize at least a swipe left gesture and a swipe right gesture performed by the user, on the user interface.

In accordance with the present disclosure, the computer readable instructions are further configured to enable the computer enabled device to convert the swipe left gesture into electric signals for transliterating the input text provided by the user, and convert the swipe right gesture into electric signals for translating the input text provided by the user.

BRIEF DESCRIPTION OF THE ACCOMPANYING DRAWINGS

The present disclosure will be better understood from the following detailed description, with reference to the accompanying drawings, in which.

DETAILED DESCRIPTION

The present disclosure envisages a computer implemented, gesture based system for selecting translation and transliteration of input text. The translation and transliteration are selective in the sense that the translated/transliterated input text is displayed to a user, only in response to predetermined gestures performed by the user. The system envisaged by the present disclosure enables efficient and effective translation & transliteration of input text from English to a plurality of Indic languages and vice-versa. The system envisaged by the present disclosure enables a user to provide the input text in a native (Indic) language, and subsequently covert the input text into English before transmission of the input text as SMS/E-mail. Further, the system also enables the user to receive a text string in English, and subsequently covert the received text string into any of the predetermined Indic languages.

Figure 1:
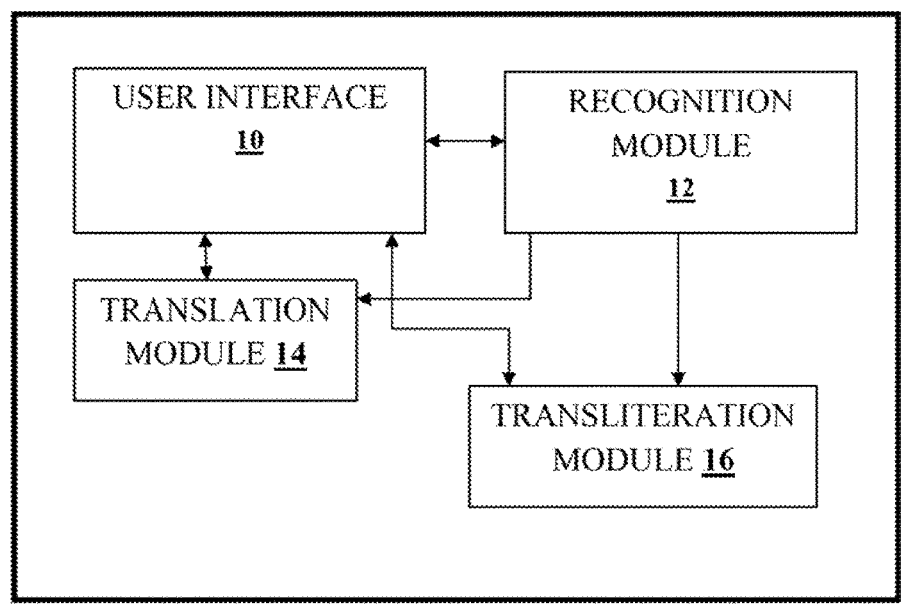
FIG. 1 illustrates a computer implemented system-level block diagram corresponding to a system for translation and transliteration of input text.

Referring to the accompanying drawings, FIG. 1 illustrates a computer implemented, gesture based system 100 for translation and transliteration of input text. The system 100, in accordance with the present disclosure includes a user interface 10. The user interface 10 is configured to, inter-alia, receive text as input from the user. The text it by the user can either be in English or in any of the predetermined Indic languages including but not restricted to Bengali, Guajarati, Assamese, Oriya, Kannada, Tamil, Telugu and Malayalam. Further, the user interface 10 is also configured to display text received in the form of emails/SMS/web pages and the like.

The user interface 10, in accordance with the present disclosure is further configured to enable a user to communicate with the user interface 10 via a predetermined set of gestures. In a preferred embodiment, the user interface 10 being hosted on a touch sensitive/responsive display screen enables the user to interact by performing certain gestures including but not restricted to a swipe gesture, right swipe gesture, tapping gesture, tap and bold gesture, circular gesture, semi-circular gesture, and double tap gesture. Further, the user interface 10 is further configured to enable the user to input text by the way of selectively tapping on the alphabet keys, alphanumeric keys, and the numeric keys displayed thereon.

The system 100, in accordance with the present disclosure further comprises a recognition module 12 cooperating with the user interface 10. The recognition module 12, in accordance with the present disclosure is configured to recognize and interpret the gestures preformed by the user on the user interface 10. The recognition module 12 is configured to recognize the point of contact of the user's finger on the user interface 10 (using well known techniques including resistive technique, capacitive technique and surface acoustic wave technique) and accordingly interpret the 'touch' from the user as selection of corresponding characters/numerals/functions displayed in the form of selectable keys.

Further, the characters/numerals whose corresponding keys are touched/selected by the user are considered as input text, by the recognition module 12. The term input text, in the context of the present disclosure is considered as a string of characters. Further, the 'input text' can also be construed as comprising a combination of alphabets and numerals. Further, the 'input text' can also be construed as a combination of alphabets, numerals and special characters. However, in a preferred embodiment of the present disclosure, for the sake of explanation, the input text is considered as a string of alphabets.

In accordance with the present disclosure, the recognition module 12 is further configured to interpret predetermined gestures of the user as gestures indicative of requesting for translation and transliteration of the input text.

In accordance with the preferred embodiment of the present disclosure, a left swipe gesture performed by the user on the user interface 10 is interpreted by the recognition module 12 as a request for transliteration of the input text. In accordance with the preferred embodiment of the present disclosure, a swipe right gesture performed by the user on the user interface 10, is interpreted by the recognition module 12 as a request for translation of the input text. The interpretations performed by the recognition module 12 in response to swap left gesture and swap right gesture are hard coded on to the recognition module 12, in accordance with the preferred embodiment of the present disclosure. However, it is with the scope of the present disclosure to substitute the swipe left and swipe right gestures with other appropriate gestures and hard-core the substituted gestures to be corresponding to translation and transliteration requests.

In accordance with the preferred embodiment of the present disclosure, the recognition module 12 cooperates with the user interface to identify a left swipe gesture and a right swipe gesture respectively. After the input text is keyed-in, if the user performs a left swipe on the user interface 10, the recognition module 12 triggers a transliteration module 16 and subsequently instructs the transliteration module 16 to transliterate the input text into a language chosen by the user, in the event that the user performs a right-swipe soon after entering the input text, the recognition module 12 triggers a translation module 14 and subsequently instructs the translation module 16 to translate the input text into a language chosen by the user. Even though, the functionalities of the translation module 14 and transliteration module 16 have been explained with reference to text input by the user, the translation module 14 and the transliteration module 16 are also configured to respectively translate and transliterate any text, for example, text received in the form of SMS/email/web-pages and the like, from the native language to the language prescribed by the user.

Figure 3B:
FIGS. 3A and 3B depict an example user interface for translating input text.
Figure 3A:
Figure 3A:
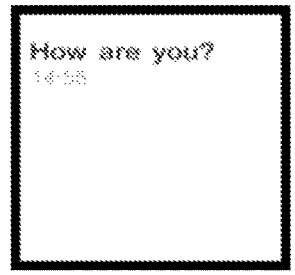

Referring to FIG. 3A, there is shown an example user interface 10, using which the user has keyed-in the sentence 'how are you' in English. Subsequent to keying-in the input text, in the event that the user performs a swipe-left gesture, the transliteration module 16 is invoked and the English text 'how are you' is transliterated into any of the Indic languages selected by the user, as shown in the FIG. 3B.

Figure 4A:
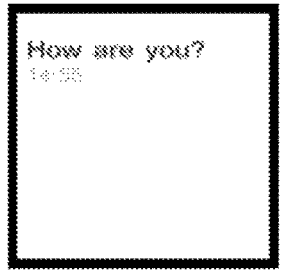
FIGS. 4A and 4B depict an example user interface for transliterating input text.
Figure 4B:
Figure 4B:

Referring to FIG. 4 there is shown another example user interface 10, using which the user has keyed-in the sentence 'how are you' in English. Subsequent to keying-in the input text, in the event that the user performs a swipe-right gesture, the translation module 14 is invoked and the English text 'how are you' is translated into any of the Indic languages selected by the user as shown in FIG. 4B.

In accordance with the present disclosure, the user interface 10 is configured to enable the user to firstly select a language for keying-in the input text. The language selected by the user could include but is not restricted to English, Hindi, Bengali, Gujarati, Assainese, Oriya, Urdu, Tamil, Telugu, Malayalam and Kannada. Further, the aforementioned non-exhaustive list of languages is also available fix selection as the language to which the input text has to be translated andlor transliterated. Further, the recognition module 12 is configured to invoke the translation module 14 and the transliteration module 16 by the way of transmitting, electric signals having instructions embedded thereupon for activating the translation module 14 and the transliteration module 16.

Further, in accordance with the present disclosure, the default screen of the user interface 10 is the screen used for keying-in the input text (as shown in FIG. 3A), after the input text is keyed-in and in the event the user performs a left-swipe gesture, the user interface 10 would, change to the view shown in FIG. 3B, and in the event that the user performs a right swipe on the user interface 10 exemplified in FIG. 3B, the user interface 10 would be restored to the default screen shown in FIG. 3A.

Further, in accordance with the present disclosure, the default screen of the user interface 10 is the screen used for keying-in the input text (as shown FIG. 4A), after the input text is keyed-in and in the event the user performs a right-swipe gesture, the user interface 10 would change to the view shown FIG. 4B, and in the event that the user performs a left swipe on the user interface 10 exemplified in FIG. 4B, the user interface 10 would be restored to the default screen shown in FIG. 4A.

Figure 2:
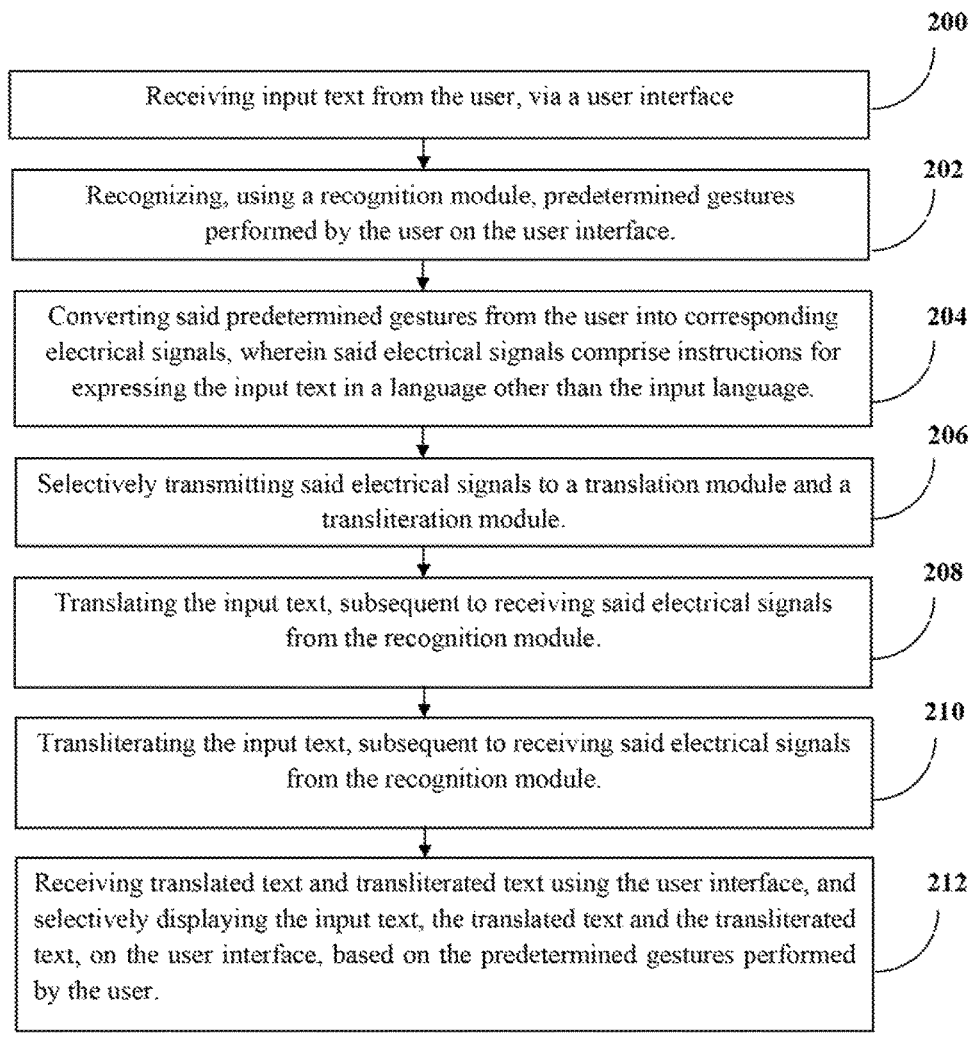
FIG. 2 is a flow chart illustrating the steps involved in a computer implemented method for translation and transliteration of input text.

Referring to FIG. 2 there is shown a flow chart illustrating the steps involved in the method for translation and transliteration of input text. The method envisaged by the present disclosure is responsive to the gestures performed by the user. The method, in accordance with the present disclosure comprises the following steps:

receiving input text from the user, via a user interface (200);

recognizing, using a recognition module, predetermined gestures performed by the user on the user interface (202);

converting said predetermined gestures from the user into corresponding electrical signals, wherein said electrical signals comprise instructions for expressing the input text in a language other than the input language (204);

selectively transmitting said electrical signals to a translation module and a transliteration module (206);

translating the input text, subsequent to receiving said electrical signals from the recognition module (208);

transliterating the input text, subsequent to receiving said electrical signals from the recognition module (210); and receiving translated text and transliterated text using the user interface;

and selectively displaying the input text, the translated text and the transliterated text, on the user interface, based on the predetermined gestures performed by the user (212).

In accordance with the present disclosure, the step of recognizing predetermined gestures performed by the user on the user interface, further includes the step of recognizing at least a swipe left gesture and a swipe right gesture performed by the user, on the user interface.

In accordance with the present disclosure, the step of recognizing at least a swipe left gesture and a swipe right gesture, further includes the step of converting the swipe left gesture into electric signals for transliterating the input text provided by the user, and converting the swipe right gesture into electric signals for translating the input text provided by the user.

Another embodiment of the present disclosure discloses a non transitory computer readable medium having computer readable instructions stored thereupon, the computer readable instructions, when executed by a processor, cause a computer enabled device to: receive input text from the user, via a user interface; recognize, using a recognition module, predetermined gestures performed by the user on the user interface; convert said predetermined gestures from the user into corresponding electrical signals, wherein said electrical signals comprise instructions for expressing the input text in a language other than the input language; selectively transmit said electrical signals to a translation module and a transliteration module; translate the input text, subsequent to receiving said electrical signals from the recognition module; transliterate the input text, subsequent to receiving said electrical signals from the recognition module; and receive translated text and transliterated text using the user interface; and selectively display the input text, the translated text and the transliterated text, on the user interface, based on the predetermined gestures performed by the user.

In accordance with the present disclosure, the computer readable instructions are further configured to enable the computer enabled device to recognize at least a swipe left gesture and a swipe right gesture performed by the user, on the user interface.

In accordance with the present disclosure, the computer readable instructions are further configured to enable the computer enabled device to convert the swipe left gesture into electric signals for transliterating the input text provided by the user, and convert the swipe right gesture into electric signals for translating the input text provided by the user.

Technical Advantages

The technical advantages envisaged by the present disclosure include the realization of a system that enables efficient and effective translation of input text. The system envisaged by the present disclosure also provides for effective and efficient transliteration of the input text. Further, the system envisaged by the present disclosure enables translation and transliteration of the input text based on predetermined gestures performed by the user. The system envisaged by the present disclosure is easy-to-use and user friendly. The system provides fir translation and transliteration of input text from a plurality of Indic languages to English and vice-versa. The system envisaged by the present disclosure enables a user to provide the input text in a native (Indic) language, and subsequently covert the input text into English before transmission of the input text as SMS/E-mail. Further, the system also enables the user to receive a text string in English, and subsequently covert the received text suing into any of the predetermined Indic languages.

What is claimed is:

1. A computer implemented system for selectively expressing an input text in a language other than the input language, based on the gestures performed by a user, said computer implemented system comprising:
   a user interface accessible to the user, said user interface configured to receive the input text from the user, and wherein the input text is in a format selected from a group consisting of email message, SMS message, and webpage extracts, said user interface further configured to display the input text on a default user interface screen thereof;
   a processor cooperating with said user interface, said processor configured to:
      recognize at least one of a selection of the input text by the user and keying-in of the input text by the user;
      recognize a left swipe gesture and a right swipe gesture performed by the user on the user interface subsequent to recognition of the selection or the keying-in of the input text, and convert the left swipe gesture into an electric signal for transliteration of the input text, and further convert the right swipe gesture into an electric signal for translation of the input text;
      trigger the translation of the input text, in an event that the signal for translation of the input text is generated in response to the right swipe gesture, and further trigger on said user interface, a display of a first user interface screen in response to the right swipe gesture, and cause said first user interface screen to display translated text corresponding to the input text, and redirect the user from said default user interface screen of said user interface to said first user interface screen of said user interface, in response to the right swipe gesture;
      trigger the transliteration of the input text, in an event that the signal for transliteration of the input text is generated in response to the left swipe gesture, and further trigger on said user interface, a display of a second user interface screen, in response to the left swipe gesture, and cause said second user interface screen to display transliterated text corresponding to the input text, and redirect the user from said default user interface screen of said user interface to said second user interface screen of said user interface, in response to the left swipe gesture;
   said processor still further configured to respectively display the translated input text and transliterated input text on said user interface and on said first user interface screen and said second user interface screen thereof, in a format equivalent to the format of the input text.

2. The system as claimed in claim 1, wherein said user interface is configured to receive the translated input text and transliterated input text from said processor, said user interface still further configured to selectively display the translated input text and the transliterated input text, in combination with the input text, in response to at least one of the left swipe gesture and right swipe gesture performed by the user.

3. The system as claimed in claim 1, wherein said translated text and said transliterated text are in a format selected from the group consisting of email message, SMS message, and webpage extracts.

4. A computer implemented method for selectively expressing an input text in a language other than the input language, based on the gestures performed by a user, said computer implemented method comprising the following steps:

receiving the input text from the user, via a user interface, and wherein the input text is in a format selected from a group consisting of email message, SMS message, and webpage extracts;

recognizing, using a processor, at least one of a selection of the input text by the user and keying-in of the input text by the user;

recognizing, using said processor, a left swipe gesture and a right swipe gesture performed by the user on the user interface, subsequent to recognition of the selection or the keying-in of the input text;

converting, by said processor, said left swipe gesture into an electric signal for triggering transliteration of the input text, and converting, by said processor, said right swipe gesture into an electric signal for triggering translation of the input text;

translating the input text using said processor, in an event the right swipe gesture is recognized by said processor and said electric signal for triggering translation of the input text is generated by said processor in response to the right swipe gesture;

triggering, on said user interface, a display of a first user interface screen in response to the right swipe gesture, and causing said first user interface screen to display translated text corresponding to the input text, and redirecting the user from said default user interface screen of said user interface to said first user interface screen of said user interface, in response to the right swipe gesture;

transliterating the input text using said processor, in an event the left swipe gesture is recognized by said processor and said electric signal for triggering transliteration of the input text is generated by said processor in response to the left swipe gesture;

triggering, on said user interface, a display of a second user interface screen in response to the left swipe gesture, and causing said second user interface screen to display transliterated text corresponding to the input text, and redirect the user from said default user interface screen of said user interface to said second user interface screen of said user interface, in response to the left swipe gesture; and displaying, on the user interface and on said first user interface screen and second user interface screen thereof, the translated text and transliterated text respectively, in a format equivalent to the format of the input text.

5. The method as claimed in claim 4, wherein the method further includes the step of selectively displaying, on said user interface, the translated input text and the transliterated input text, in combination with the input text, in response to at least one of the swipe left gesture and swipe right gesture performed by the user.

6. A non-transitory computer readable medium having computer readable instructions stored thereupon, said computer readable instructions, when executed by a processor, cause the processor to:

receive input text from the user via a user interface, and wherein the input text is in a format selected from a group consisting of email message, SMS message, and webpage;

configure said user interface to display the input text on a default user interface screen thereof;

recognize at least one of a selection of the input text by the user and keying-in of the input text by the user;

recognize a left swipe gesture and a right swipe gesture performed by the user on the user interface, subsequent to recognition of the selection or the keying-in of the input text;

convert said left swipe gesture into an electric signal for triggering transliteration of the input text, and convert said right swipe gesture into an electric signal for triggering translation of the input text;

translate the input text in an event the right swipe gesture is recognized and said electric signal for triggering translation of the input text is generated in response to the right swipe gesture;

trigger, on said user interface, a display of a first user interface screen in response to the right swipe gesture, and cause said first user interface screen to display translated text corresponding to the input text, and redirect the user from said default user interface screen of said user interface to said first user interface screen of said user interface, in response to the right swipe gesture;

transliterate the input text in an event the left swipe gesture is recognized and said electric signal for triggering transliteration of the input text is generated in response to the left swipe gesture;

trigger, on said user interface, a display of a second user interface screen in response to the left swipe gesture, and cause said second user interface screen to display transliterated text corresponding to the input text, and redirect the user from said default user interface screen of said user interface to said second user interface screen of said user interface, in response to the left swipe gesture; and display, on the user interface and on said first user interface screen and second user interface screen thereof, the translated text and transliterated text respectively, in a format equivalent to the format of the input text.

* * * * *